(12) United States Patent
Foreman, Jr.

(10) Patent No.: US 12,449,315 B2
(45) Date of Patent: Oct. 21, 2025

(54) MODIFIED THERMOCOUPLE ASSEMBLY

(71) Applicant: Foreman Instrumentation & Controls, Inc., Houston, TX (US)

(72) Inventor: Timothy H. Foreman, Jr., Houston, TX (US)

(73) Assignee: Foreman Instrumentation & Controls, Inc., Houston, TX (US)

( * ) Notice: Subject to any disclaimer, the term of this patent is extended or adjusted under 35 U.S.C. 154(b) by 533 days.

(21) Appl. No.: 17/978,483

(22) Filed: Nov. 1, 2022

(65) Prior Publication Data
US 2024/0142315 A1   May 2, 2024

(51) Int. Cl.
| | |
|---|---|
| G01K 7/04 | (2006.01) |
| G01K 1/02 | (2021.01) |
| G01K 1/024 | (2021.01) |
| G01K 7/13 | (2006.01) |
| H10N 10/17 | (2023.01) |

(52) U.S. Cl.
CPC ............. G01K 7/04 (2013.01); G01K 1/024 (2013.01); G01K 1/026 (2013.01); G01K 7/13 (2013.01); H10N 10/17 (2023.02)

(58) Field of Classification Search
CPC .. G01K 7/13; G01K 7/02; G01K 7/04; G01K 1/026; H10N 10/17
USPC ......................................................... 374/179
See application file for complete search history.

(56) References Cited

U.S. PATENT DOCUMENTS

| | | | |
|---|---|---|---|
| 2,696,118 | A | 12/1954 | Petry |
| 3,053,091 | A | 9/1962 | Braunagel |
| 3,417,618 | A | 12/1968 | Morrisette |
| 3,921,453 | A | 11/1975 | Platzer, Jr. |

(Continued)

FOREIGN PATENT DOCUMENTS

WO   WO2008088433 A1   7/2008

OTHER PUBLICATIONS

International Search Report and Written Opinion for International Application No. PCT/US2023/034523 of Apr. 12, 2024.

Primary Examiner — Kristina M Deherrera
Assistant Examiner — Gilbert Bernard Shuster
(74) Attorney, Agent, or Firm — Stephen S. Hodgson

(57) ABSTRACT

A thermocouple assembly is provided that allows a first type of thermocouple to be used with thermoelements compatible with a second type of thermocouple. For a single thermocouple, a translator device measures a temperature using a new thermocouple and determines and outputs a voltage difference to existing thermoelements for a replaced thermocouple. For two or more thermocouples, a new terminal block is provided between an existing transmitter and the existing thermocouples, which are replaced by new thermocouples of a different type connected to the new terminal block. Existing extension wires are used to make a thermocouple at the new terminal block. A multiplexer is connected to terminals at the existing transmitter or terminal block. Temperatures at the new thermocouples are determined by forming particular circuits and using the temperature at the new block. Additional temperatures can also be determined using existing extension thermoelements. New installation cost can be reduced and functionality can be added using type B, R or S thermocouples with type K or type N extension wire or compensation cable.

27 Claims, 3 Drawing Sheets

(56) References Cited

U.S. PATENT DOCUMENTS

| | | | | |
|---|---|---|---|---|
| 4,130,019 | A | * | 12/1978 | Nitschke ................ G01K 1/026 |
| | | | | 374/E1.005 |
| 4,370,546 | A | | 1/1983 | Warner |
| 4,590,326 | A | | 5/1986 | Woldy et al. |
| 5,735,605 | A | | 4/1998 | Blalock |
| 7,044,638 | B2 | * | 5/2006 | Phillips .................... G01K 7/04 |
| | | | | 374/E7.009 |
| 7,234,864 | B2 | | 6/2007 | Streicher |
| 7,946,762 | B2 | | 5/2011 | Vednak, III |
| 8,485,724 | B2 | * | 7/2013 | Aberra .................... G01K 7/14 |
| | | | | 374/100 |
| 10,234,335 | B2 | | 3/2019 | Hunter |
| 10,996,113 | B2 | | 5/2021 | Foreman, Jr. |
| 2007/0268957 | A1 | | 11/2007 | Kovacevich |
| 2013/0163633 | A1 | | 6/2013 | Liu et al. |
| 2013/0343429 | A1 | | 12/2013 | Kalteis et al. |
| 2015/0131701 | A1 | | 5/2015 | Hedayat |
| 2016/0377489 | A1 | | 12/2016 | Sin |
| 2018/0238743 | A1 | | 8/2018 | Rud et al. |
| 2020/0173863 | A1 | | 6/2020 | Gajdarus |

\* cited by examiner

MODIFIED THERMOCOUPLE ASSEMBLY

BACKGROUND OF THE INVENTION

1. Field of the Invention

This invention relates generally to temperature measurement devices, particularly thermocouple assemblies, and more particularly to a modified thermocouple assembly in which different types of thermocouple elements are combined.

2. Description of the Prior Art

Thermocouples are widely used for temperature measurement of machines and processes in the chemical, petroleum, electronics, food, manufacturing and various other industries. Temperature measurement of chemical processes, for example, requires the placement of thermocouples in process units, such as columns, strippers, scrubbers, and reactors. To ensure reliable, efficient operation and process control, process unit temperature is continuously monitored using several thermocouples embedded at various locations within the process unit.

FIG. 1 provides an example of a basic and standard thermocouple assembly used in the prior art. Thermocouples TC1 and TC2 are provided for measuring temperatures T1 and T2, respectively. A pair of higher-grade thermoelements extends between each of TC1 and TC2 to a terminal block having a temperature T3. Lower-grade extension thermoelements connect the higher-grade thermoelements to a terminal block having a temperature T4. A transmitter or measuring instrument is connected to the T4 terminal block, which is used to measure the temperature T4 and voltage differences between the thermoelements connected to each of TC1 and TC2. Voltage differences are converted to temperature differences using standardized equations or charts for a particular type of thermoelement. Most of the temperature difference measured is typically between T1/T2 and T3. T4 is typically an ambient temperature at the transmitter or measuring instrument, and the temperature at T3 typically depends upon its location. The lower-grade extension thermoelements between T3 and T4 are typically made of a thermocouple wire or of thermoelement that produces an electromotive force (emf) response for voltage and temperature differences similar to that of the higher-grade thermoelements between T1/T2 and T3. Lower-grade extension thermoelements are typically lower cost and/or better suited for a particular operating environment. An extension-grade thermoelement will typically have a very similarly matched and equivalent voltage output versus temperature difference as a thermocouple-grade wire with which it is used. Both the lower-grade thermoelement combinations (extension grade) and the more accurate and expensive thermocouple grade are typically used for all types of thermocouples, and polynomial equations are published to represent their voltage output versus temperature difference. The extension grade wire is typically acceptable to use because a temperature difference (dT) across this region is relatively small, and its contribution to the overall temperature measurement is small. Therefore, the error produced from the lower grade wire is less relevant.

The higher-grade thermoelements that extend between each of TC1 and TC2 to the terminal block having the temperature T3 are labeled as TG5 and TG6 to imply thermocouple grade wire. The lower-grade extension thermoelements that extend from the terminal block having the temperature T3 to the terminal block having the temperature T4 are labeled as TE5 and TE6 to imply extension grade wire. The lower-grade extension thermoelements TE5 and TE6 are used in an embodiment of the present invention described with reference to FIG. 3. A type K thermocouple probe is used extensively in industry and is made when a nickel-chromium alloy wire is welded to a nickel-alumel alloy wire. Extension wire for a type K thermocouple has a lower purity specification than is used for the thermocouple probe. The nickel-chromium alloy wire may be considered a positive leg, and the nickel-alumel alloy wire may be considered a negative leg.

A temperature difference dT between T1/T2 and T4 can be determined by connecting a measuring instrument to the terminals at T4 and using standard equations or curves provided for the particular thermoelement combinations used between T1 and T4. Since only a dT measurement is produced, the measuring instrument measures its ambient temperature, which is called a cold junction temperature. In some applications, such as for industrial processes, the distance between T3 and T4 may be a very long distance (100s of meters), and the distance between T1/T2 and T3 may be a relatively short distance, probably less than one to a few meters. In applications for engines, these distances may be measured in centimeters. A problem arises where there is a need or desire to change the type of thermocouple used for measuring T1/T2, but it is impractical due to the necessity of replacing the lower-grade extension thermoelements between T3 and T4.

SUMMARY OF THE INVENTION

The present invention provides thermocouple assemblies and methods for changing, generally upgrading, one or more thermocouples to a different type while continuing to use existing extension wires, compensation cables, measuring instruments and/or transmitters. For changing or upgrading a single thermocouple connected to a measuring instrument or a transmitter, one replaces the existing thermocouple with a new thermocouple of a different type and runs new thermocouple wires from the new thermocouple to a new terminal block. The new terminal block includes a digital or analog processor of some type that is designed and configured to receive a new voltage difference from the new thermocouple wires and to correlate the new voltage difference to a temperature T measured by the new thermocouple. Using standardized equations or charts, the processor correlates the temperature T to an old voltage difference between old thermocouple wires from the replaced thermocouple and outputs this old voltage difference to existing thermocouple wires or extension wires that are connected to the existing measuring instrument or transmitter, which uses the old voltage difference to indicate the temperature T.

This case of changing or upgrading a single thermocouple connected to a measuring instrument or a transmitter can be described as follows. One embodiment of the present invention that allows one to change the type of thermocouple used to measure or indicate a temperature can be described as a thermocouple assembly that comprises a type 1 thermocouple for indicating a temperature T; a thermocouple translator device (TTD); type 1 thermocouple wires connecting the type 1 thermocouple to the TTD; a type 2 measuring instrument; and type 2 thermocouple wires or type 2 extension wires connecting the TTD to the type 2 measuring instrument, where type 1 and type 2 indicate different types of thermocouple material, and where the TTD is designed and configured to: measure a voltage difference VD1 at the TTD between the type 1 thermocouple wires; determine or estimate the temperature T for a type 1 thermocouple; determine or estimate a voltage difference VD2 for a type 2 thermocouple for the determined or estimated temperature T; and output the voltage difference VD2 to the type 2 thermocouple wire or type 2 extension wire, thereby providing an input to the type 2 measuring instrument that can be used for determining and/or indicating the temperature T.

One may instead want to change or upgrade two related thermocouples, where one may be redundant to the other or both are measuring related temperatures. These old thermocouples are connected to an existing measuring instrument or transmitter using four existing thermoelements such as thermocouples wires, extension wires or compensation cable. The old thermocouples are replaced with new first and second thermocouples of a different type than the old thermocouples, such as replacing an existing type K thermocouple with a new type N thermocouple. It is not necessary for the new first thermocouple to be the same type as the new second thermocouple. A new terminal block is installed, which preferably does not require a power source. Two existing wires or thermoelements that have different compositions of matter are connected to a terminal in the new terminal block, thereby forming a new thermocouple junction to measure and provide a new temperature in the new terminal block, which is preferably an isothermal terminal block. The other two existing thermoelements are connected to separate and independent terminals in the new terminal block. A thermocouple wire from each of the new first and second thermocouples is connected to the new thermocouple junction. The other thermocouple wire from each of the new first and second thermocouples is connected to the separate and independent terminals in the new terminal block such that these other thermocouple wires are not in contact with one another. The existing wires or thermoelements terminate on terminals in an existing terminal block, and an existing measuring instrument and/or transmitter is connected to the existing terminal block, which will preferably continue to be used. However, a new calculating and switching device, preferably a multiplexer, is operatively connected to existing terminal block with connections to the existing terminals. The existing transmitter continues to provide a cold junction temperature at the existing terminal block, which can be used with a voltage difference between the thermoelements connected to the new thermocouple junction to indicate the temperature at the new thermocouple junction. The calculating and switching device is designed and configured to measure a voltage difference between terminals in the existing terminal block that are related to the first new thermocouple while terminals related to the second new thermocouple are not connected together so that the second new thermocouple does not interfere with determining a temperature at the first new thermocouple. The voltage difference between terminals in the existing terminal block that are related to the first new thermocouple along with the cold junction temperature in the existing terminal block and the temperature at the new thermocouple junction are used to determine the temperature at the first new thermocouple. The temperature at the second new thermocouple is determined in a like manner by opening and closing circuits using the terminals in the existing terminal block.

The present invention with respect to changing or upgrading two related thermocouples can be described as follows. Another embodiment of the present invention that allows one to change the type of thermocouple used to measure or indicate a temperature can be described as a thermocouple assembly that comprises first and second thermocouples of the same type or different types; thermocouple wires extending from the first and second thermocouples to a first block; a third thermocouple in the first block, wherein a leg from each of the first and second thermocouples is connected to the third thermocouple, and wherein the other leg from each of the first and second thermocouples is connected to first and second separate and independent terminals, respectively, in the first block; a second block; first and second extension wires joined together at one end to form the third thermocouple and extending to separate and independent terminals in the second block, wherein the first and second extension wires do not have the same thermo-electric properties as the thermocouple wires; third and fourth extension wires connecting the first and second terminals, respectively, in the first block to separate and independent terminals in the second block; and equipment operatively connected to the second block and/or to the terminals in the second block that is designed and configured to measure, determine and/or estimate a temperature at each of the first, second and third thermocouples.

The equipment is preferably designed and configured to determine temperatures at the first and second blocks, and where the equipment is preferably designed and configured to determine a temperature at the first thermocouple using a voltage difference between terminals at the second block that receive the first and third extension wires while no circuit is made using the terminals at the second block that receive the second and fourth extension wires. The equipment is also preferably designed and configured to determine a temperature at the second thermocouple using a voltage difference between terminals at the second block that receive the second and fourth extension wires while no circuit is made using the terminals at the second block that receive the first and third extension wires.

The equipment preferably includes a measuring instrument transmitter and a switching and calculating device, such as a multiplexer, which are used to determine temperatures at the first and second blocks. The extension wires and the thermocouples wires can be different metal compositions, and the extension wires do not need to be suitable for use as extensions of the thermocouple wires. For example, the first and second thermocouples can be type N and the extension wires can be type K extension wire, which allows one to replace a type K thermocouple with a type N thermocouple. If more temperature measurements are needed, then two or more additional thermocouples are preferably employed, where a leg from each of a pair of additional thermocouples is connected to a new thermocouple that is formed at the junction of extension cables that run from the new thermocouple to separate and independent terminals at the second block. It is not necessary for the new thermocouple to be located in the first block, which allows a new temperature measurement to be made.

Another embodiment of the present invention is a thermocouple assembly that comprises thermocouples TC1 and TC2 to TCn for measuring temperatures T1 and T2 through Tn, respectively, where TC1 is formed at a junction of thermoelements TE1 and TE2, where TC1 is a Type12 thermocouple, where TC2 is formed at a junction of thermoelements TE3 and TE4, where TC2 is a Type34 thermocouple, where each of the thermocouples from TC2 to TCn is made in a manner similar to TC1 and TC2, and where the thermocouples TC1 and TC2 to TCn can be the same or different or a variety of types of thermocouples; proximal and distal isothermal blocks with respect to TC1 and TC2; a thermocouple TCp formed at a junction of thermoelements TE5 and TE6 and located in the proximal block, where thermocouple TCp is a Type56 thermocouple, where thermoelements TE5 and TE6 terminate at terminals TRM1 and TRM2 in the distal block, respectively, where thermoelement TE2 from TC1 and thermoelement TE3 from TC2 are connected to thermocouple TCp.

This embodiment includes a total of n−1 thermocouple junctions including the junction for thermocouple TCp between one or more temperature measurement zones and the distal block, where a thermoelement from one of the thermocouples and a thermoelement from another one of the thermocouples between the thermocouples TC2 and TCn is connected to each of the thermocouple junctions between the one or more temperature measurement zones and the distal block, where each of the n−1 thermocouple junctions is formed by a pair of compensated thermoelements, where each strand in a pair of compensated thermoelements extends from its respective thermocouple junction in or associated with the proximal block to a separate and independent terminal in the distal block, where a thermoelement from TC1 is connected to a terminal TRM3 in the proximal block, and where a thermoelement used to make the thermocouple junction TCn is connected to a terminal TRM4 in the proximal block; a strand of a first thermoelement extends between terminal TRM3 and a terminal TRM5 in the distal block; and a strand of a second thermoelement extends between terminal TRM4 in the proximal block and a terminal TRMn in the distal block.

Equipment comprising a multiplexer is operatively connected to the terminals in the distal block for making and breaking circuits within the thermocouple assembly and a transmitter or measuring instrument determines an ambient or cold junction temperature at the distal block and outputs temperature indications or measurements, which can be transmitted to a control center. The multiplexer is configured to form circuits from each of the thermocouples TC1 and TC2 to TCn to terminals in the distal block, where the circuit comprises a pair of compensated thermoelements that form their respective thermocouple and extend from the respective thermocouple to separate terminals or thermocouples in or associated with the proximal block, and where the circuit further comprises a pair of uncompensated thermoelements that extend from said separate terminals or thermocouples in the proximal block to separate and independent terminals in the distal block. Each of these circuits is formed for a thermocouple without interference from another thermocouple. Each circuit comprises a pair of compensated thermoelements from a thermocouple to terminals or a thermocouple in the proximal block or associated with the proximal block and a pair of uncompensated thermoelements, extension wires or cables that extend from said terminals or thermocouple in or associated with the proximal block to terminals in the distal block. The multiplexer makes and breaks connections using the terminals in the distal block to form these individual circuits, which are used by the multiplexer and/or the transmitter or measuring instrument to determine or estimate a temperatures for each of T1 and T2 through Tn.

BRIEF DESCRIPTION OF THE DRAWINGS

By way of illustration and not limitation, the invention is described in detail hereinafter on the basis of the embodiments represented in the accompanying figures, in which.

DETAILED DESCRIPTION OF THE PREFERRED EMBODIMENTS

Figure 2:
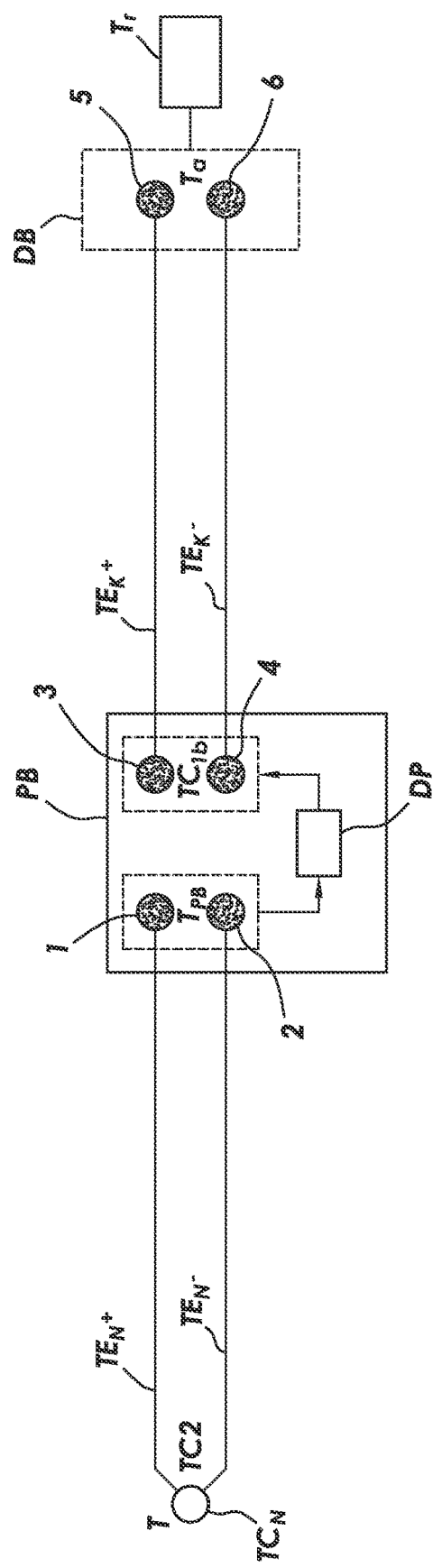
FIG. 2 is a schematic diagram of a thermocouple assembly in which a first type of thermocouple for measuring a temperature has been changed to a second type, while continuing to use extension thermoelements for the first type, according to the present invention.

FIG. 2 is a schematic diagram of a thermocouple assembly in which a first type of thermocouple has been changed to a second type of thermocouple. For example, a Type K thermocouple has been changed to a Type N thermocouple. In this example, a thermocouple $TC_N$ is a Type N thermocouple, and it is used to measure a temperature T. However, the temperature T was originally measured using a Type K thermocouple, and there is a long length of lower-grade Type K extension thermoelements $TE_K+$ and $TE_K-$ that extends from a proximal terminal block PB to a distal terminal block DB. It is considered economically impractical to change out the lower-grade Type K extension thermoelements $TE_K+$ and $TE_K-$ to Type N extension thermoelements in this example, but it is desirable to change to a Type N thermocouple for measuring the temperature T. The distance from the thermocouple $TC_N$ to the proximal block PB is considered short, while the distance from the proximal block PB to the distal block DB is considered very long. The Type N thermocouple $TC_N$ has replaced a previous Type K thermocouple (not shown), and Type N thermoelements $TE_N+$ and $TE_N-$ extend from the Type N thermocouple $TC_N$ to terminals 1 and 2 in the proximal block PB, respectively. The Type K extension thermoelements $TE_K+$ and $TE_K-$ are attached to terminals 3 and 4 in the proximal block PB, respectively.

In some applications, it is not possible to change a type of thermocouple without changing an existing measuring instrument, which may not be practical. For example, a thermocouple might be connected directly to a measuring instrument with no extension wires, and the measuring instrument may only be capable of reading a Type K thermocouple, but there is a need to change the thermocouple to a Type N. The present invention allows one to change the thermocouple from a Type K to a Type N while continuing to use the measuring instrument that is only capable of reading a Type K thermocouple.

A digital processor DP is installed in the proximal block PB, and leads from the terminals 1 and 2 are routed into the digital processor DP. The digital processor DP measures a temperature $T_{PB}$ in the proximal block PB; measures a voltage difference V12 between terminals 1 and 2; and determines or estimates the temperature T using the temperature $T_{PB}$, the voltage difference V12 and standardized tables or polynomial equations provided by the American Society for Testing and Materials (ASTM). The digital processor DP is programmed to determine a voltage difference V34 that corresponds to the temperature T for a Type K thermocouple and to then output the voltage difference V34 to the terminals 3 and 4. The Type K extension thermoelements $TE_K+$ and $TE_K-$ extend between the terminals 3 and 4 to terminals 5 and 6 in the distal block DB, respectively.

The digital processor DP should have appropriate circuitry to accurately measure the required input signals and to produce output signals. The front end of the electronics in the digital processor DP may be analog input circuitry (an amplifier circuit) with an analog-to-digital converter, and the back end of the electronics may be analog output circuitry that includes a digital-to-analog converter. While all of the processing can be done using analog circuitry, calculations and configuration will be easier using a digital processor between the front and back analog portions.

A transmitter (or measuring device, or controller, or indicator) Tr is operatively connected to detect a voltage difference V56 between terminals 5 and 6. There is a voltage difference V34 between terminals 3 and 4. There may be a temperature difference between the proximal block PB and the distal block DB, which contributes a voltage difference Vpd to the voltage difference V56. The voltage difference V56 is the sum of the voltage difference V34 and the voltage difference Vpd. The transmitter Tr measures its local, ambient temperature Ta and uses the ambient temperature Ta, the voltage difference V56 and standardized tables or polynomial equations provided by the ASTM for a Type K thermocouple to output a determination or an estimate of the temperature T. The ambient temperature Ta is used to properly place a voltage difference on a correct spot of a curve showing a relationship between voltage difference and temperature. The curve may not be perfectly linear. The ambient temperature at the measuring instrument is used to then find a correct voltage-difference-and-temperature relationship between curves for two different thermocouples and to output a translated voltage difference based on the same temperature difference dT. This is not an absolute temperature and is instead a temperature difference. For all TC measurements, the dT measured should be added to the cold junction temperature T4 (TCJ) at the measuring device. The dT measured plus TCJ is equal to the absolute temperature.

A method is thus provided for changing a type of thermocouple in a thermocouple assembly having a Type 1 thermocouple for determining a value for a measured temperature Tm, a Type 1 measuring instrument or transmitter and Type 1 thermoelements, extension wire and/or compensation cable extending between the Type 1 thermocouple and the Type 1 measuring instrument. One replaces the Type 1 thermocouple with a Type 2 thermocouple, where Type 1 and Type 2 mean any two different types of thermocouples. The Type 1 thermocouple was used previously to indicate the measured temperature Tm, and now the Type 2 thermocouple will be used to determine or estimate the measured temperature Tm. A thermocouple translator device TTD, such as a digital processor, is installed between the measured temperature Tm and the measuring instrument. Type 2 thermoelements are connected between the Type 2 thermocouple and the TTD. A voltage difference VD2 is measured at and by the TTD, and the TTD is programmed to determine or estimate the measured temperature Tm for a Type 2 thermocouple. The TTD is programmed to determine or estimate a voltage difference VD1 for a Type 1 thermocouple for the determined or estimated measured temperature Tm at the TTD. The TTD is programmed to have standardized tables or polynomial equations provided by the ASTM for correlating a voltage difference to a temperature for Type 1 and Type 2 thermocouples. The TTD is programmed to output the calculated voltage difference VD1 to the Type 1 thermoelements, extension wire and/or compensation cable using the voltage difference VD2 and an ambient local reference temperature Tr at the Type 1 measuring instrument as inputs. The same instrument that is measuring the TC input of the Type 2 will typically also measure a local cold junction temperature. The measurement is typically done with a thermistor, which is simple to add to most modern electronics and will provide a reasonably accurate absolute temperature reading. The Type 1 measuring instrument or transmitter is operatively connected to the Type 1 thermoelements, extension wire and/or compensation cable and reads the voltage difference VD1 as being from the original Type 1 thermocouple. The Type 1 measuring instrument or transmitter is programmed to have standardized tables or polynomial equations provided by the ASTM for correlating the voltage difference VD1 to a temperature T1 using the local reference temperature Tr at the Type 1 measuring instrument. The Type 1 measuring instrument or transmitter determines or estimates the measured temperature Tm as T1 plus Tr. With respect to replacing the Type 1 thermocouple with a Type 2 thermocouple, an alternative is to replace the Type 1 thermocouple with a resistance temperature detector (RTD), a thermistor, an infrared pyrometer, a value from an infrared camera, a value from an infrared camera array or a calculated temperature based on a known correlation to temperature. With reference to FIG. 2, the digital processor DP determines a temperature using the output from the alternative temperature device; calculates a proper voltage output for that temperature for the Type 1 measuring instrument or transmitter.

FIG. 2 illustrates a thermocouple assembly that comprises a temperature measuring device (TMD) selected from a group consisting of a type 1 thermocouple, a resistance temperature detector (RTD), a thermistor, an infrared pyrometer and an infrared camera, wherein the TMD is designed and configured to measure or indicate a temperature T; a thermocouple translator device (TTD) operatively connected to the TMD, wherein the TMD outputs a voltage to the TTD that corresponds to the temperature T; and a measuring instrument or transmitter that is designed and configured to receive an input from a type 2 thermocouple and to indicate the temperature T. The TTD is operatively connected to the measuring instrument or transmitter and is designed and configured to: determine or estimate the temperature T based on the input from the TMD; calculate or determine a voltage output VO from a type 2 thermocouple that corresponds to the temperature T; and input the voltage output VO to the measuring instrument or transmitter so that the measuring instrument or transmitter can calculate, measure and/or indicate the temperature T as though an input was received from a type 2 thermocouple. The type 1 and type 2 thermocouples may or may not comprise different compositions of matter. The type 1 and type 2 thermocouples can be type B, C, E, J, K, N, R, S or T thermocouples.

Figure 3:
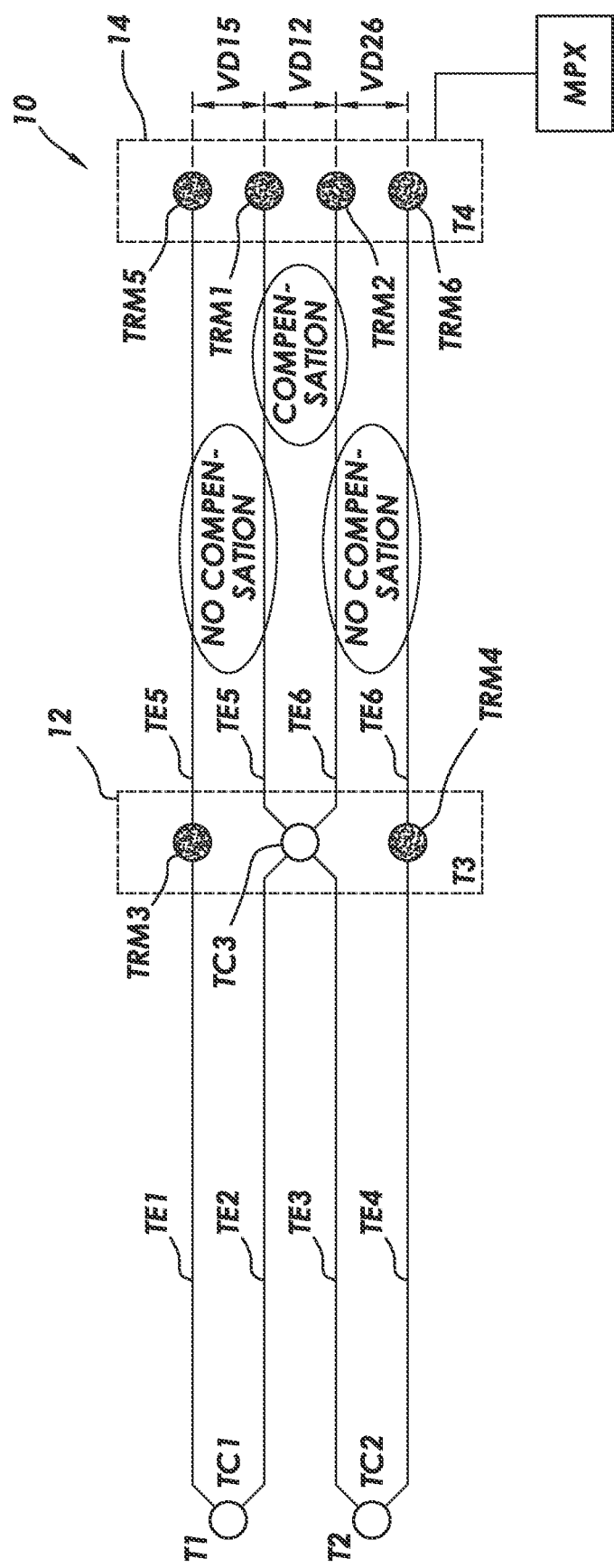
FIG. 3 is a schematic diagram of a thermocouple assembly in which two thermocouples for measuring two temperatures have been changed to another type of thermocouple, while continuing to use extension thermoelements for the first type, according to the present invention.

FIG. 3 is a schematic diagram of a thermocouple assembly 10 for determining temperatures T1 and T2 in a hot or cold zone or in two different hot or cold zones. T1 and T2 can measure the same or different temperatures and can be installed in the same or different locations. Thermocouple assembly 10 includes thermocouples TC1 and TC2 for measuring or determining temperatures T1 and T2, respectively. Thermocouple TC1 is formed at a junction of thermoelements TE1 and TE2, and TC1 is a Type12 thermocouple. TC2 is formed at a junction of thermoelements TE3 and TE4, and TC2 is a Type34 thermocouple. Thermocouples TC1 and TC2 can be the same or different types of thermocouples. TE1 (positive) and TE2 (negative) are different compositions of materials and may be different compositions of noble metals, which are generally considered expensive. Thermocouple types are identified by letters such as B, C, E, J, K, N, R, S and T. Thermocouple types are identified herein by numbers to imply that any type of thermocouple suitable for a particular application can be used according to the present invention. The temperatures T1 and T2 are described herein as being hot temperatures typically encountered in industrial processes, turbines and engines, but the present invention is also applicable for cold temperatures such as encountered in cryogenic processes.

Thermocouple assembly 10 includes proximal 12 and distal 14 terminal blocks, where the proximal terminal block 12 is considered reasonably close to the thermocouples TC1 and TC2, and the distal terminal block 14 is considered somewhat far away from the thermocouples TC1 and TC2. The proximal 12 and distal 14 terminal blocks are preferably isothermal blocks at temperatures of T3 and T4, respectively. A thermocouple TC3 is in the proximal terminal block 12 and is formed at a junction of thermoelements TE5 and TE6. Thermocouple TC3 is a Type56 thermocouple. Thermoelement TE5 is not necessarily an extension thermoelement that is considered compatible with thermoelement TE1 of the Type12 thermocouple used to determine the temperature T1. Thermoelement TE6 is not necessarily an extension thermoelement that is considered compatible with the thermoelement TE3 in the Type34 thermocouple used to determine the temperature T2. Thermoelement TE5 extends from thermocouple TC3 to a terminal TRM1 in the distal terminal block 14. Thermoelement TE6 extends from thermocouple TC3 to a terminal TRM2 in the distal terminal block 14. Thermoelements TE5 and TE6 comprise different compositions of material so that a voltage difference VD12 can be measured between terminals TRM1 and TRM2 for use in determining the temperature T3 at the proximal terminal block 12. The different compositions of material for thermoelements TE5 and TE6 provides compensation between TE5 and TE6.

Thermoelement TE2 extends from thermocouple TC1 to thermocouple TC3 and is connected to thermocouple TC3. Thermoelement TE3 extends from thermocouple TC2 to thermocouple TC3 and is connected to thermocouple TC3. Thermoelements TE2 and TE3 are normally, but not necessarily, different compositions of matter. Thermoelement TE1 extends from thermocouple TC1 to a terminal TRM3 in the proximal block 12. Thermoelement TE4 extends from thermocouple TC2 to a terminal TRM4 in the proximal block 12. A strand of the thermoelement TE5 extends between terminal TRM3 and a terminal TRM5 in the distal block 14, and a strand of the thermoelement TE6 extends between terminal TRM4 and a terminal TRM6 in the distal block 14. It is important to note that the composition of the thermoelement TE5 between terminal TRM3 in the proximal block 12 to the terminal TRM5 in the distal block 14 is the same as the composition of the thermoelement TE5 between thermocouple TC3 in the proximal block 12 and terminal TRM1 in the distal block 14. Consequently, no temperature difference between temperature T3 and temperature T4 can be detected by a voltage difference between the terminals TRM5 and TRM1 because no compensation is provided between the proximal block 12 and the distal block 14 for the thermoelements TE5 connected to the terminals TRM5 and TRM1.

The same is true for the thermoelement TE6 that extends from both the thermocouple TC3 and the terminal TRM4 in the proximal block 12 to the terminals TRM2 and TRM6 in the distal block 14, respectively. There is no voltage difference between terminals TRM2 and TRM6 in the distal block 14 due to a temperature difference between temperature T3 in the proximal block 12 and temperature T4 in the distal block 14 because no compensation is provided between the proximal block 12 and the distal block 14 for the thermoelements TE6 connected to the terminals TRM2 and TRM6.

With reference to FIG. 3, the thermocouple assembly 10 is used to determine or estimate the temperatures T1 and T2 as follows. A measuring instrument or a transmitter (not shown) is used to determine the temperature T4 at the distal block 14, which is generally an ambient temperature. The measuring instrument or a transmitter measures the voltage difference VD12 between the terminals TRM1 and TRM2 and then uses the voltage difference VD12, the temperature T4 at the distal block 14 and standard specification and temperature-electromotive force (emf) tables for standardized thermocouples or polynomial equations such as provided in ASTM E230 to determine or estimate the temperature T3 in the proximal block 12 for a Type56 thermocouple. For a further explanation as to how the temperature T3 is determined, see, for example, U.S. Pat. No. 7,044,638 issued to Phillips and assigned to Rosemount Aerospace, Inc., which is incorporated by reference. The term "Type56 thermocouple" is not intended to be an actual standard type of thermocouple and is instead intended to be a generic reference to a preferred type of thermocouple for a particular application. The same is true for thermocouple Type12 and Type34, as this terminology is intended as a generic reference to any thermocouple type that is suitable for a particular application. For example, the Type 56 thermocouple TC3 may actually be a Type K thermocouple, and the Type12 and the Type34 thermocouples TC1 and TC2, respectively, may actually be a Type N thermocouple.

The temperature T3 in the proximal block 12 can be used as a reference temperature for determining or estimating the temperatures T1 and T2 in the hot zone. The measuring instrument or a transmitter, which is not shown in the drawings, is preferably programmed to measure a voltage difference VD15 between the terminals TRM1 and TRM5 in the distal block 14. There is no voltage difference between terminals TRM1 and TRM5 that is attributable to a temperature difference between T3 at the proximal block 12 and the temperature T4 at the distal block 14 because the same thermoelement TE5 is used between the thermocouple TC3 and terminal TRM1 and between the terminal TRM3 in the proximal block 12 and the terminal TRM5 in the distal block 14. Temperature compensation, in the form of a voltage difference, can only be obtained for a difference in temperature when different thermoelements are paired together across the zones of differing temperature. The voltage difference generated between the two dissimilar thermoelements correlates to the temperature difference. Therefore, when thermoelements of similar materials are used across a temperature difference each thermoelement produces the same voltage difference and their sum difference is zero or no compensation or uncompensated. A simple example of uncompensated thermoelements is two copper wires or copper vs. copper.

A voltage difference exists between terminals TRM1 and TRM5, which is attributable to a temperature difference between the temperature T1 in the hot zone and the temperature T3 in the proximal block 12. A temperature difference that corresponds to the voltage difference VD15 can be determined by the measuring instrument or transmitter using the standardized tables or polynomial equations provided by the American Society for Testing and Materials (ASTM). The temperature difference that corresponds to the voltage difference VD15 is the difference in temperature between the temperature T1 in the hot zone and the temperature T3 in the proximal block 12 for a Type12 thermocouple. It is considered a Type12 thermocouple because the thermoelements TE1 and TE2 provide the temperature-electromotive force between terminals TRM1 and TRM5, since the same thermoelement TE5 is used between thermocouple TC3 and terminal TRM1 and between terminal TRM3 and terminal TRM5. The temperature T1 in the hot zone can be determined or estimated as the difference in temperature between the temperature T1 in the hot zone and the temperature T3 in the proximal block 12 plus the temperature T3.

The temperature T2 is determined or estimated similarly. A voltage difference VD26 is measured between terminals TRM2 and TRM6 in the distal block 14, which is attributable to a temperature difference between T2 in the hot zone and T3 in the proximal block. A temperature difference that corresponds to the voltage difference VD26 can be determined by the measuring instrument or transmitter using the standardized tables or polynomial equations provided by the ASTM for a Type34 thermocouple. The temperature T2 is determined or estimated as the temperature difference that corresponds to the voltage difference VD26, which is the difference between T2 and T3. This difference between T2 and T3 plus the temperature T3 provides a determination or an estimation of the temperature T2 in the hot zone. This is simply (T2−T3)+T3=T2 The temperature T3 in the proximal block 12 effectively provides a cold junction temperature or reference temperature for determining the temperature T2 in the hot zone. No temperature difference is measured between the temperature T3 in the proximal block 12 and the temperature T4 in the distal block 14 because the same thermoelement TE6 extends between the proximal block 12 and the terminals TRM2 and TRM6 in the distal block 14.

The measuring instrument should be capable of making independent differential measurements between the various terminal (thermoelement) pairs without causing interference between the instrument or between the different measurements (other pair reading to be measured). This is typically accomplished by isolating the differential pairs to be measured and only reading from those two elements. A multiplexer configuration, in either a mechanical relay form or in a solid-state multiplexer form, is one method that can successfully accomplish such isolated readings. A solid-state multiplexer MPX is shown in FIG. 3. With this setup and for simplicity, only two terminal connections will be activated (connection closed) at a time. This allows the needed differential mV measurement to be taken, and then the multiplexer is cycled to the next reading pair option. For the example of FIG. 3, there are 4 lines (thermoelements/terminals) that must be measured in various differential pair configurations to obtain all of the needed readings. These are labeled TRM5, TRM1, TRM2, and TRM6. To measure the output formed by TC3 along the dT from T3 to T4 and with TE5 and TE6, the multiplexer would position connections TRM1 and TRM2 closed (connection made) and TRM5 and TRM6 open (no connection). Since the mV from a thermoelement (in this case TE5 or TE6) is generated along the thermogradient of the conductive thermoelement, then only the voltage provided at TRM1 versus at TRM2 will be from the dT from T3 to T4 from TE5 and TE6, respectively. All other thermoelements in FIG. 3 are outside of the measured pair (loop) and will not contribute to the reading. TC3 creates a "dead short" and "zeros out" the legs on the other side that are "floating" or not connected to anything and are outside a measured loop. It is not an absolute requirement to only take one reading at a time. In some configurations, measuring equipment types, and operating conditions, it may be possible to take multiple reading simultaneously. Possible examples might include long high impedance wire runs, very high-quality electronics and proximity. A measuring instrument should preferably be able to isolate any set of connections to measure, but it should have the option to measure more than one set of connection at a time and/or have more than one set of connection activated (relay closed) at a time. When this would or would not work depends on the exact configuration. The full multiplexer on one set at a time should work for all conditions and configurations.

One measures the output formed by T1 along the dT from T1 to T3 and with TE1+TE5 and TE2+TE5 using connections to and measuring a voltage difference VD15 between TRM1 and TRM5. The contributing output from both legs labeled TE5 between the proximal block 12 and the distal block 14 can be ignored since this is a differential reading and their contribution will be the same and opposing and will therefore cancel out, meaning "No Compensation." The multiplexer should switch connections TRM2 and TRM6 open (no connection) and TRM5 and TRM1 closed (connection made) and. The differential voltage reading VD15 measured from TRM5 and TRM1 will represent the TC1 output from T1 to T3. All other thermoelements (TE3, TE4, TE6) are floating, meaning outside a measured loop, and will not contribute to or interfere with the measurement.

Similarly, one measures the output formed by T2 along the dT from T2 to T3 and with TE4+TE6 and TE3+TE6 using connections to and measuring a voltage difference between TRM2 and TRM6. The contributing output from both legs labeled TE6 can be ignored since this is a differential reading and their contribution will be the same and opposing and will therefore cancel out. There is no compensation between the thermoelements labeled TE6 in FIG. 3. The multiplexer should switch connections TRM2 and TRM6 closed (connection made) and TRM5 and TRM1 open (no connection). The differential voltage reading VD26 measured from TRM2 and TRM6 will represent the TC2 output from T2 to T3. All other thermoelements (TE1, TE2, TE5) are floating or outside a measured loop and will not contribute to or interfere with the measurement. It should be noted that one pair at the middle terminal junction 12 should not be connected and therefore not form an additional middle junction thermocouple. This is represented in FIG. 3 with TRM3 and TRM4 not being connected together to form an additional thermocouple as was done to form TC3. This feature allows the system to be switched to positions that isolate readings for each of TC1, TC2, and TC3.

Figure 1:
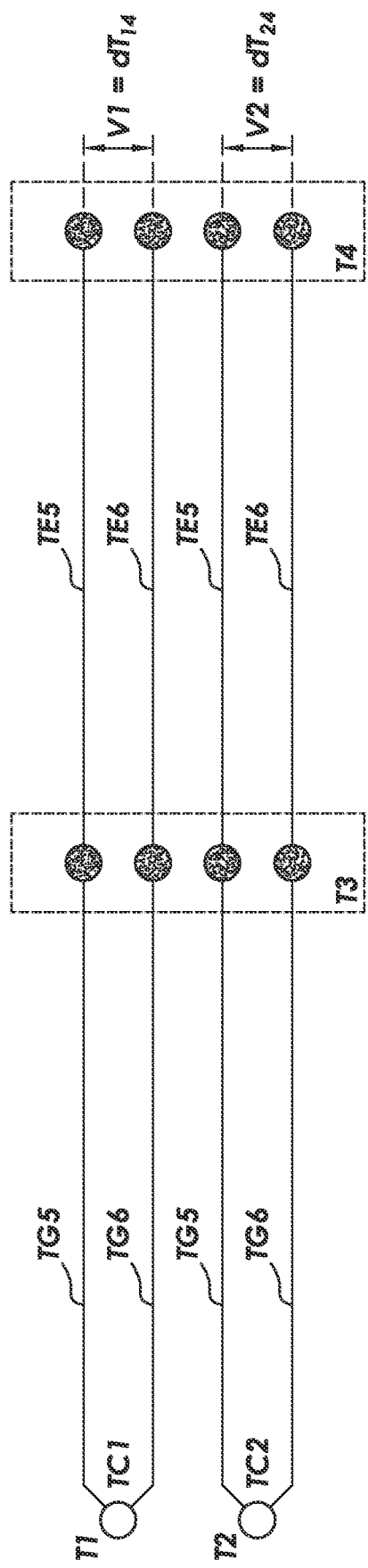
FIG. 1 is a schematic diagram of a thermocouple assembly, according to the prior art.

One possible use for the embodiment in FIG. 3 is in an application where there is more than one thermocouple and extension wires (at least two as shown in FIG. 3) and the existing thermocouple types are the same. One wishes to change to a different type of thermocouple, but it is desired that the extension (compensation) wire for the system not be changed, which could be due to simplicity, cost, impracticality or some other reason. As an example, a process flare within a chemical plant, a refinery or in oil and gas operations is very common and typically requires multiple thermocouples for monitoring whether the flare is operating properly. Two Type K thermocouples have typically been used to monitor the flare along with sets of Type K extension/compensation wire (KX wire). The configuration is similar to FIG. 1, which consists of TC1 and TC2, which would be positioned to monitor the flare at T1 and T2, respectively. T3 would represent a terminal block at the other end of the thermocouple and is typically located within a thermocouple head (a small junction box), which allows a connection to the extension wires that connect T3 to T4. The terminal block is typically located away from the heat of the flare measured at T1/T2, but is still relatively close to the flare/flame. Typically, the distance from T3 to T4 would be a much greater and the wiring of the Type K extension/compensation wire (KX wire) would be difficult and expensive to replace if the user wants to make a change in the thermocouple type used to monitor the flare.

The present invention allows one to change the Type K thermocouples to an alternate thermocouple type while still using the existing Type K (KX) extension/compensation wiring. The embodiment of the present invention described with reference to FIG. 3 illustrates how two thermocouples adjacent to a flare flame can be changed to a different type of thermocouple while continuing to use existing extension/compensation wiring. In this example, the Type K thermocouple can be changed to a Type N thermocouple (TC1 with TE1/TE2 and TC2 with TE3/4), and an additional thermocouple would be formed at a terminal block (T3). The existing Type K (KX) extension/compensation wiring would continue to be used (TE5, TE5, TE6, TE6). Other possibilities include first and second thermocouples and thermoelements that are type B, R or S and thermoelements, extension wires or compensation cable that are type K or type N.

A new or reconfigured measuring instrument would be required at T4 to properly take the required measurements and perform the needed calculations. The new or reconfigured measuring instrument would likely include a multiplexer. The benefits of this configuration allows one to change thermocouple types in an existing system without changing the extension wire and without providing additional electronics at the transition point between the flare flame thermocouples and the extension wire, such as at the terminal block 12 in FIG. 3. The location of the terminal block near the flare flame would likely be unsuitable for electronics and would require a power source, which may not be readily available at the location. The electronics, including the multiplexer, would be located at the distal block 14 in FIG. 3, which is typically a more accommodating location, which is cooler and more accessible and has power available.

If there are more than two thermocouples, then the thermocouples should be addressed in sets of two. This is needed so the system will maintain the needed like pairs (same thermoelement types) for no compensation between the T3 to T4 blocks. If there are 5 TCs and 2 of TCa and 3 of TCb, then this system will still work, but the odd TC (the third of TCb) should maintain its TC compensation type from Tb3 (hot/T1) to T3 to T4. The odd TC should work as a standard TC with compensation cable, and all others (even numbered/paired) will work as described with reference to FIG. 3.

Figure 4:
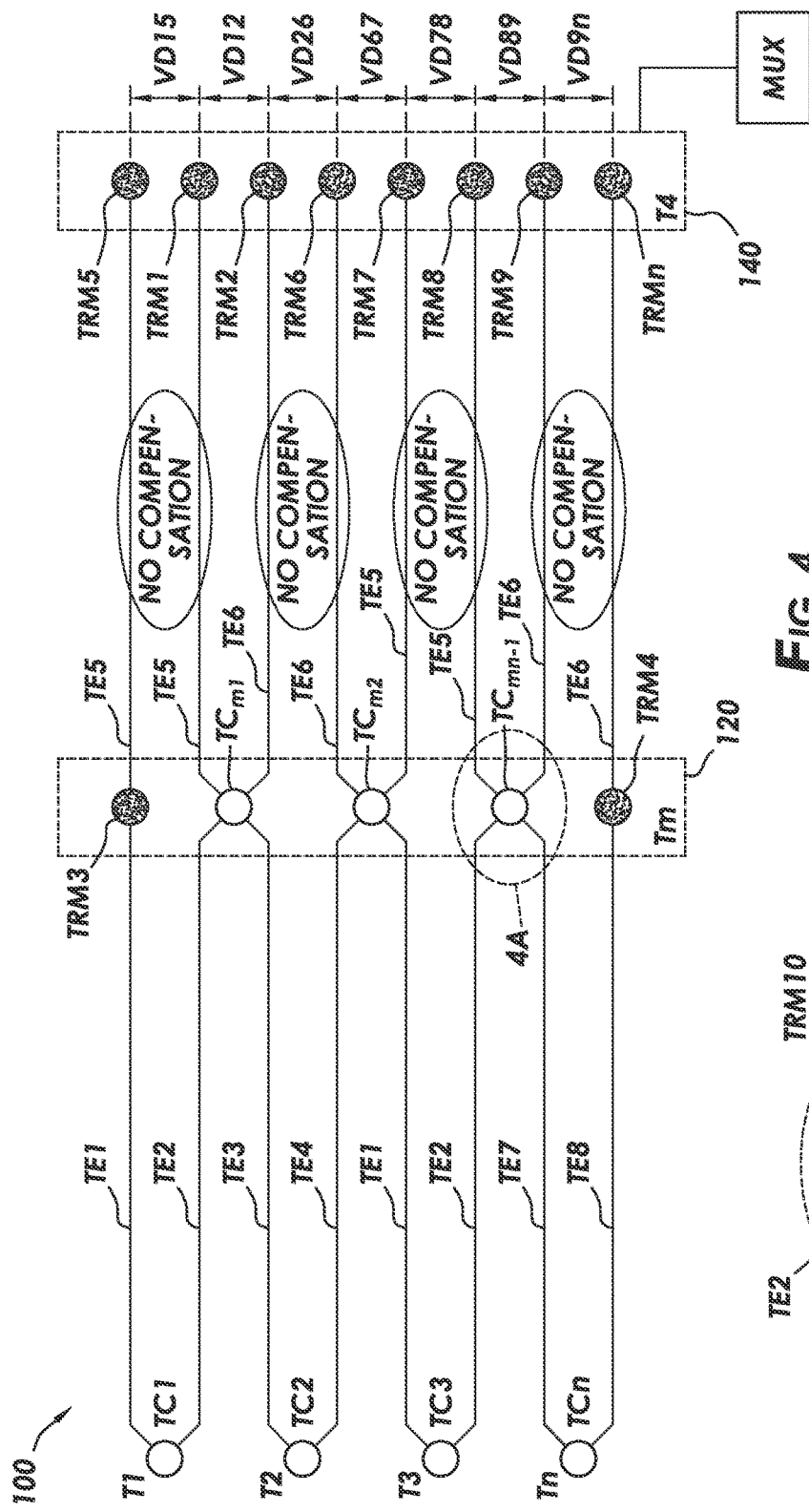
FIG. 4 is a schematic diagram of a thermocouple assembly in which any number of thermocouples for measuring a same number of temperatures have been changed to one or more other types of thermocouple, while continuing to use extension thermoelements for the first type, according to the present invention.

FIG. 4 is a schematic diagram of a thermocouple assembly 100 for determining temperatures T1, T2 and T3 through Tn in hot or cold zones. The concept described for thermocouple assembly 10 with reference to FIG. 3 extends to the measurement of any number of temperatures (up to Tn) measured or determined by a same number of thermocouples (up to TCn) using one fewer proximal or intermediate thermocouples (up to $TC_{n-1}$). Thermocouple assembly 100 in FIG. 4 includes thermocouples TC1 and TC2 for measuring or determining temperatures T1 and T2, respectively. Thermocouple TC1 is formed at a junction of thermoelements TE1 and TE2, and TC1 is a Type12 thermocouple. TC2 is formed at a junction of thermoelements TE3 and TE4, and TC2 is a Type34 thermocouple.

Thermocouple assembly 100 includes middle 120 and distal 140 terminal blocks, where the middle terminal block 120 is between the thermocouples TC1 and TC2 and the distal terminal block 140. The middle 120 and distal 140 terminal blocks are preferably isothermal blocks at temperatures of Tm and T4, respectively. A thermocouple $TC_{m1}$ is in the middle terminal block 120 and is formed at a junction of thermoelements TE5 and TE6. Thermocouple $TC_{m1}$ is a Type56 thermocouple. Thermoelement TE5 extends from thermocouple $TC_{m1}$ to a terminal TRM1 in the distal terminal block 140. Thermoelement TE6 extends from thermocouple $TC_{m1}$ to a terminal TRM2 in the distal terminal block 140. Thermoelements TE5 and TE6 comprise different compositions of material so that a voltage difference VD12 can be measured between terminals TRM1 and TRM2 for use in determining the temperature Tm at the middle terminal block 120. A measuring instrument or transmitter (not shown) is used to determine a temperature T4 at the terminals TRM1 and TRM2. The voltage difference VD12 is correlated to a temperature difference Td between Tm and T4 using a chart or polynomial equation provided by the ASTM for a type56 thermocouple, and the temperature Tm is determined or estimated as Td plus T4 by the measuring instrument or transmitter. A solid-state multiplexer MUX is shown in FIG. 4, which operates in the same manner as the multiplexer described above with reference to FIG. 3 for making particular circuits for obtaining particular measurements.

Thermocouples TC1 and TC2 can be the same or different types of thermocouples, and TC1 and TC2 can be near each other or far apart and can be used for measuring the same or different temperatures. Thermoelement TE2 extends from thermocouple TC1 to thermocouple TCm1 and is connected to thermocouple TCm1. Thermoelement TE3 extends from thermocouple TC2 to thermocouple TCm1 and is connected to thermocouple TCm1. Thermoelements TE2 and TE3 can be the same or different compositions of matter. These strands of the thermoelements TE2 and TE3 will be used in separate circuits for determining the temperatures T1 and T2 as explained below. Thermoelement TE1 extends from thermocouple TC1 to a terminal TRM3 in the middle block 120. A strand of the thermoelement TE5 extends between terminal TRM3 and a terminal TRM5 in the distal block 140.

The temperature Tm in the middle block 120 can be used as a reference temperature for determining or estimating the temperature T1. The measuring instrument or a transmitter, which is not shown in the drawings, is preferably programmed to measure a voltage difference VD15 between the terminals TRM1 and TRM5 in the distal block 140. There is no voltage difference between terminals TRM1 and TRM5 that is attributable to a temperature difference between Tm at the middle block 120 and the temperature T4 at the distal block 140 because the same thermoelement TE5 is used between the thermocouple $TC_{m1}$ and terminal TRM1 and between the terminal TRM3 in the middle block 120 and the terminal TRM5 in the distal block 140. These strands of thermoelement TE5 are labeled in FIG. 4 as having no compensation.

However, a voltage difference exists between terminals TRM1 and TRM5, which is attributable to a temperature difference between the temperature T1 in the hot zone and the temperature Tm in the middle block 120. A temperature difference that corresponds to the voltage difference VD15 can be determined by the measuring instrument or transmitter using the standardized tables or polynomial equations provided by the American Society for Testing and Materials. The temperature difference that corresponds to the voltage difference VD15 is the difference in temperature between the temperature T1 in the hot zone and the temperature Tm in the middle block 120 for a Type12 thermocouple. The temperature T1 in the hot zone can be determined or estimated as the difference in temperature between the temperature T1 in the hot zone and the temperature Tm in the middle block 120 plus the temperature Tm. T1−Tm+Tm=T1.

A thermocouple TCm2 in the middle block 120 is formed at a junction of thermoelements TE6 and TE5. Thermocouple $TC_{m2}$ is a Type65 thermocouple. Thermoelement TE6 extends from thermocouple $TC_{m2}$ to a terminal TRM6 in the distal terminal block 140. Thermoelement TE5 extends from thermocouple $TC_{m2}$ to a terminal TRM7 in the distal terminal block 140. Thermoelement TE4 extends from thermocouple TC2 to thermocouple $TC_{m2}$ in the middle block 120.

The composition of the thermoelement TE6 between thermocouple $TC_{m2}$ in the middle block 120 and the terminal TRM6 in the distal block 140 is the same as the composition of the thermoelement TE6 between thermocouple $TC_{m1}$ in the middle block 120 and terminal TRM2 in the distal block 140. Consequently, no temperature difference between temperature Tm and temperature T4 can be detected by a voltage difference between the terminals TRM2 and TRM6 because no compensation is provided between the middle block 120 and the distal block 140 for the thermoelements TE6 connected to the terminals TRM2 and TRM6. These strands of the thermoelements TE6 are labeled in FIG. 4 as having no compensation because their composition is the same.

The temperature T2 is determined as follows. A voltage difference VD26 exists between terminals TRM2 and TRM6, which is attributable to a temperature difference between the temperature T2 in the hot zone and the temperature Tm in the middle block 120. A temperature difference that corresponds to the voltage difference VD26 can be determined by the measuring instrument or transmitter using the standardized tables or polynomial equations provided by the ASTM. The temperature difference that corresponds to the voltage difference VD26 is the difference in temperature between the temperature T2 in the hot zone and the temperature Tm in the middle block 120 for a Type34 thermocouple. It is considered a Type34 thermocouple because the thermoelements TE3 and TE4 provide the temperature-electromotive force between terminals TRM2 and TRM6, since the same thermoelement TE6 is used between thermocouple $TC_{m1}$ and terminal TRM2 and between thermocouple $TC_{m2}$ and terminal TRM6. The temperature T2 in the hot zone can be determined or estimated as the difference in temperature between the temperature T2 in the hot zone and the temperature Tm in the middle block 120 plus the temperature Tm. T2−Tm+Tm=T2

A thermocouple TC3 is formed at a junction of thermoelements TE1 and TE2 for measuring or estimating a temperature T3 in a hot or cold zone. Thermoelements TE1 and TE2 were also used for making thermocouple TC1, but different types of thermoelements can be used because it is not necessary for thermocouple TC3 be the same type as thermocouple TC1. The thermoelement TE1 for thermocouple TC3 extends between thermocouple TC3 and thermocouple $TC_{m2}$ in the middle block 120. However, it is not necessary to use thermoelements TE1 and TE2 for measuring or estimating a temperature T3 because any two different thermoelements can be used.

A thermocouple $TC_{mn-1}$ in the middle block 120 is formed at a junction of thermoelements TE5 and TE6. Thermocouple $TC_{mn-1}$ is a Type56 thermocouple. Thermoelement TE5 for thermocouple $TC_{mn-1}$ extends from thermocouple $TC_{mn-1}$ to a terminal TRM8 in the distal terminal block 140. Thermoelement TE6 for thermocouple $TC_{mn-1}$ extends from thermocouple $TC_{mn-1}$ to a terminal TRM9 in the distal terminal block 140. The thermoelement TE2 for thermocouple TC3 extends from thermocouple TC3 to thermocouple $TC_{mn-1}$ in the middle block 120.

The temperature T3 is determined as follows. A voltage difference VD78 exists between terminals TRM7 and TRM8, which is attributable to a temperature difference between the temperature T3 in the hot zone and the temperature Tm in the middle block 120. A temperature difference that corresponds to the voltage difference VD78 can be determined by the measuring instrument or transmitter using the standardized tables or polynomial equations provided by the ASTM. The temperature difference that corresponds to the voltage difference VD78 is the difference in temperature between the temperature T3 in the hot zone and the temperature Tm in the middle block 120 for a Type12 thermocouple. It is considered a Type12 thermocouple because the thermoelements TE1 and TE2 provide the temperature-electromotive force between terminals TRM7 and TRM8, since the same thermoelement TE5 is used between thermocouple TCm2 and terminal TRM7 and between thermocouple TCmn−1 and terminal TRM8. The temperature T3 in the hot zone can be determined or estimated as the difference in temperature between the temperature T3 in the hot zone and the temperature Tm in the middle block 120 plus the temperature Tm. In simple terms. T3−Tm+Tm=T3. In preferred terms, (T3−Tm)+(Tm−T4)+T4. In more preferred terms, $dT(\frac{7}{8})+dT(\frac{5}{6})+T4=T3$ $dT(\frac{1}{2})+dT(\frac{5}{6})+T4=T3$.

Any number of temperatures can be measured or estimated in hot or cold zones up to a temperature Tn being measured or estimated by a thermocouple TCn. The thermocouple TCn can be formed by a junction of any suitable thermoelements for a particular application. The thermocouple TCn in FIG. 4 is illustrated generically as being formed by a junction of thermoelements TE7 and TE8, which are different composition of material so that a temperature-electromotive force will be generated between TE7 and TE8 that can be correlated with the temperature Tn. The thermoelement TE7 extends between the thermocouple TCn and the thermocouple $TC_{mn-1}$ and is attached to the thermocouple $TC_{mn-1}$. The thermoelement TE8 extends from the thermocouple TCn to a terminal TRM4 in the middle terminal block 120. A strand of the thermoelement TE6 is connected to the terminal TRM4 and extends to and is connected to a terminal TRMn in the distal terminal block 140.

The temperature Tn is determined as follows. A voltage difference VD9n exists between terminals TRM9 and TRMn, which is attributable to a temperature difference between the temperature Tn in the hot zone and the temperature Tm in the middle block 120. A temperature difference that corresponds to the voltage difference VD9n can be determined by the measuring instrument or transmitter using the standardized tables or polynomial equations provided by the ASTM. The temperature difference that corresponds to the voltage difference VD9n is the difference in temperature between the temperature Tn in the hot zone and the temperature Tm in the middle block 120 for a Type78 thermocouple. It is considered a Type78 thermocouple because the thermoelements TE7 and TE8 provide the temperature-electromotive force between terminals TRM9 and TRMn, since the same thermoelement TE6 is used between thermocouple TCmn−1 and terminal TRM9 and between terminal TRM4 in the middle block 120 and terminal TRMn in the distal block 140. The temperature Tn in the hot zone can be determined or estimated as the difference in temperature between the temperature Tn in the hot zone and the temperature Tm in the middle block 120 plus the temperature Tm. Tn−Tm+Tm=Tn. Or, dT(⅞)+Tm+T4=Tn, where Tm is calculated via dT(⅝) or by other means.

It is important that the terminals TRM3 and TRM4 in the middle block 120 are pass-through connections for the first and last thermoelements used in measuring the temperatures T1 and Tn, respectively. The first thermoelement TE1 passes from thermocouple junction TC1 for measuring temperature T1 to terminal TRM3, and thermoelement TE5 passes from terminal TRM3 in the middle block 120 to terminal TRM5 in the distal block 140, without a thermocouple junction being formed in the middle block 120 at the terminal TRM3. The last thermoelement TE8 passes from thermocouple junction TCn for measuring temperature Tn to terminal TRM4, and thermoelement TE6 passes from terminal TRM4 in the middle block 120 to terminal TRMn in the distal block 140, without a thermocouple junction being formed in the middle block 120 at the terminal TRM4. It is important that there is no compensation between thermoelements for adjacent thermocouple junctions in the middle block 120 so that a temperature difference between the measured temperature in the hot zone and the temperature Tm in the middle block 120 can be determined. As an aside, although it was stated that the terminals TRM3 and TRM4 in the middle block 120 are pass-through connections for the first and last thermoelements used in measuring the temperatures T1 and Tn, respectively, what is important is that the circuit should be broken as was described above.

Figure 4A:
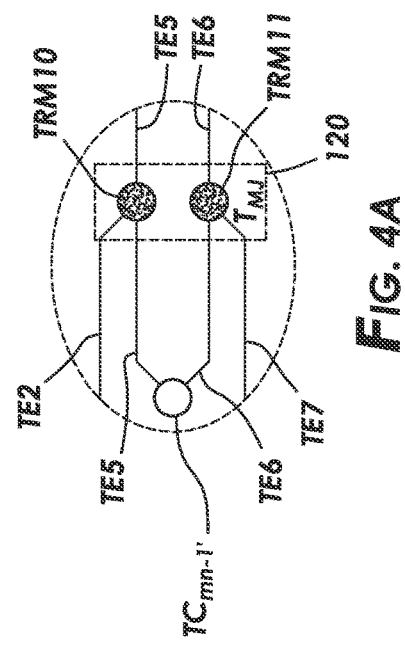
FIG. 4A is an alternative embodiment of the thermocouple assembly of FIG. 4, according to the present invention.

FIG. 4A is an alternative embodiment for the thermocouple TCmn−1 in the middle block 120 in FIG. 4. A thermocouple TCmn−1' is shown outside of the middle isothermal block 120. Thermocouple TCmn−1' is formed at the junction of thermoelements TE5 and TE6, which extend beyond the middle block 120. Thermoelement TE2 or a thermoelement TE2' extends from the thermocouple TC3 to a terminal TRM10 in the middle block 120. Thermoelement TE7 still extends from the thermocouple TCn to the middle block 120, but to a terminal TRM11. It is necessary to have one thermocouple junction in the middle block 120 in FIG. 4 for measuring the isothermal temperature Tm in the middle block 120. However, other thermocouples, such as thermocouple TCmn−1', can be used to measure a temperature in a different location. The temperature T3 in FIG. 4 can still be measured or estimated using the alternative configuration illustrated in FIG. 4A, provided there is no compensation between the thermoelement TE5 between thermocouple TCm2 and terminal TRM7 in FIG. 4 and the thermoelement TE5 between terminal 10 in FIG. 4A and the terminal TRM8 in FIG. 4. The temperature Tn in FIG. 4 can still be measured or estimated as described above, but using the alternative configuration illustrated in FIG. 4A, provided that the rules provided herein are followed that concern which thermoelements are compensated and which thermoelements are not compensated so that a temperature difference between Tn and Tm can be determined. It should be noted that TCmn−1' can be of a different TC type than of a TC made of thermoelements 5 and 6. This can be done since one knows the isothermal temperature Tm in the middle block 120 and, therefore, the mV generated by TE5 vs. TE6 for the isothermal temperature Tm. The mV of the thermoelements connected to TCmn−1' is determined by the difference in the total mV at VD89 less the mV for Tm (VD12). TCmn−1' can be of a different TC type than of a TC made of (TEs 5/6). This can be done since one knows the temperature Tm in block 120 and therefore the mV generated by TE5 vs. TE6 for the temperature Tm. The mV of TE5' vs TE6' is determined by the difference in the total mV at TRM8/9 less the mV for Tm (TE 5/6).

EMBODIMENTS OF THE INVENTION

Various embodiments of the invention can be described as follows.

Embodiment 1. A thermocouple assembly for measuring at least two temperatures, comprising:
a thermocouple TC1 for measuring a temperature T1;
a thermocouple TC2 for measuring a temperature T2, wherein T1 and T2 may have equal or different values and may be in the same or different locations;
a first terminal block TB1 and a second terminal block TB2, wherein the terminal block TB1 is between the thermocouple TC1 and the terminal block TB2;
a thermocouple TC3 for measuring a temperature T3 at the terminal block TB1;
a pair of compensated thermoelements TE1 and TE2 joined to form thermocouple TC1;
a pair of compensated thermoelements TE3 and TE4 joined to form thermocouple TC2;
a pair of compensated thermoelements TE5 and TE6 joined to form thermocouple TC3,
wherein thermoelements TE1, TE2, TE3, TE4, TE5 and TE6 comprise any suitable composition of matter for a desired application,
wherein thermoelements TE5 and TE6 extend from thermocouple TC3 and connect to terminals TRM1 and TRM2, respectively, in the terminal block TB2,
wherein thermoelement TE1 connects to a terminal TRM3 in the terminal block TB1,
wherein thermoelement TE2 connects to thermocouple TC3,
wherein thermoelement TE3 connects to thermocouple TC3, and
wherein thermoelement TE4 connects to a terminal TRM4 in the terminal block TB1;
a strand of thermoelement TE5 connected to terminal TRM3 in the terminal block TB1 and extending to a terminal TRM5 in the terminal block TB2;
a strand of thermoelement TE6 connected to terminal TRM4 in the terminal block TB1 and extending to a terminal TRM6 in the terminal block TB2;
a measuring instrument transmitter Tr operatively connected to the second terminal block TB2, wherein the transmitter Tr is designed and configured to determine an ambient temperature Ta at the terminal block TB2 and to have standardized tables or polynomial equations provided by the American Society for Testing and Materials for correlating voltage differences to temperature differences for one or more types of thermocouples;
wherein the transmitter Tr is designed and configured to determine a voltage difference VD12 between terminals TRM1 and TRM2 and to use the voltage difference VD12 and the ambient temperature Ta to determine or estimate the temperature T3 at the thermocouple TC3;

a switching and calculating device SCD operatively connected to the second terminal block TB2 and the transmitter Tr that is designed and configured to connect and disconnect terminals in the second terminal block TB2, wherein the transmitter Tr and the device SCD are designed and configured to determine or estimate the temperature T1 using a voltage difference VD15 between terminals TRM1 and TRM5 while terminals TRM2 and TRM6 are not connected to another terminal, and wherein the transmitter Tr and the device SCD are designed and configured to determine or estimate the temperature T2 using a voltage difference VD26 between terminals TRM2 and TRM6 while terminals TRM1 and TRM5 are not connected to another terminal.

Embodiment 2. The thermocouple assembly of embodiment 1, wherein the switching and calculating device SCD is a multiplexer.

Embodiment 3. The thermocouple assembly of embodiment 1, wherein the thermoelement TE3 has the same composition of matter as the thermoelement TE1, and wherein the thermoelement TE4 has the same composition of matter as the thermoelement TE2, or wherein the thermoelement TE3 comprises a composition of matter that is not the same as the composition of matter that thermoelement TE1 comprises, and/or wherein the thermoelement TE4 comprises a composition of matter that is not the same as the composition of matter that thermoelement TE2 comprises.

Embodiment 4. The thermocouple assembly of embodiment 1, wherein neither the thermoelement TE5 nor TE6 has the same composition of matter as the thermoelement TE1 or TE2, and preferably wherein neither the thermoelement TE5 nor TE6 has the same composition of matter as the thermoelement TE3 or TE4.

Embodiment 5. A thermocouple assembly, comprising:
first and second thermocouples for measuring first and second desired temperatures, respectively;
  first and second pairs of compensated thermoelements that extend from the first and second thermocouples, respectively, to a first isothermal block;
  a third thermocouple for measuring a temperature of the first isothermal block, wherein one thermoelement from each of the first and second thermocouples connects to the third thermocouple;
  two terminals in the first isothermal block, wherein the other thermoelement from each of the first and second thermocouples connects to one of said terminals;
  a second isothermal block, wherein the first isothermal block is between the first and second thermocouples and the second isothermal block;
  a pair of compensated thermoelements 1 and 2 extending from the third thermocouple to separate terminals in the second isothermal block;
  a strand of thermoelement 1 extending from one of the two terminals in the first isothermal block to a separate terminal in the second isothermal block;
  a strand of thermoelement 2 extending from the other of the two terminals in the first isothermal block to a separate terminal in the second isothermal block;
  a measuring instrument transmitter and a switching device operatively connected to the second isothermal block, wherein the transmitter is designed and configured to indicate an ambient temperature for the second isothermal block and to determine or estimate the temperature of the first isothermal block, and wherein the transmitter and the switching device are designed and configured to determine or estimate the first and second desired temperatures.

Embodiment 6. A thermocouple assembly comprising:
first and second thermocouples having positive and negative leads extending to a first block, wherein the positive lead from the first thermocouple connects to a first separate and independent terminal in the first block, wherein the negative lead from the second thermocouple connects to a second separate and independent terminal in the first block, and wherein the negative lead from the first thermocouple and the positive lead from the second thermocouple connect to a third thermocouple, wherein the third thermocouple is located in the first block;

positive and negative extension wires extending from the third thermocouple to third and fourth terminals, respectively, in a second block, wherein the extension wire comprises a material that does not match with material in the positive and negative leads of the first and second thermocouples;

a positive or negative extension wire extending from the first terminal to a fifth terminal in the second block;

a negative or positive extension wire extending from the second terminal to a sixth terminal in the second isothermal block, wherein the extension wire to the sixth terminal has an opposite polarity to the extension wire to the fifth terminal; and means connected to and/or engaged with the second block for opening and closing connections between the terminals in the second block, wherein the means is designed and configured to determine temperatures at the first and second blocks and to use said temperatures and correlations between voltage differences and temperature differences to determine or estimate temperatures at the first and second thermocouples.

Embodiment 7. The thermocouple assembly of embodiment 6, wherein the means comprises a measuring instrument transmitter and a switching and calculating device, wherein the transmitter is designed and configured to measure, determine or estimate an ambient temperature at the second block and a temperature at the third thermocouple, and wherein the device is designed and configured to open and close circuits and to make calculations and/or correlations for determining temperatures at the first and second thermocouples.

Embodiment 8. The thermocouple assembly of embodiment 6 or 7, wherein the switching and calculating device is a multiplexer.

Embodiment 9. A thermocouple assembly comprising:
first and second type N thermocouples having positive and negative leads extending to a first isothermal block, wherein the positive lead from the first thermocouple connects to a first separate and independent terminal in the first isothermal block, wherein the negative lead from the second thermocouple connects to a second separate and independent terminal in the first isothermal block, and wherein the negative lead from the first thermocouple and the positive lead from the second thermocouple connect to a third thermocouple located in the first isothermal block;

positive and negative type K extension wires extending from the third thermocouple to third and fourth terminals, respectively, in a second isothermal block;

a positive type K extension wire extending from the first terminal to a fifth terminal in the second isothermal block;

a negative type K extension wire extending from the second terminal to a sixth terminal in the second isothermal block; and means connected to and/or engaged with the second isothermal block for opening and closing connections between the terminals in the second isothermal block, wherein the means is designed and configured to determine temperatures at the first and second isothermal blocks and to use said temperatures and correlations between voltage differences and temperature differences to determine or estimate temperatures at the first and second type N thermocouples, and wherein the actual polarity of the positive and negative elements is not an essential feature of the thermocouple assembly.

Embodiment 10. A thermocouple assembly comprising:

thermocouples TC1 and TC2 to TCn for measuring temperatures T1 and T2 through Tn, respectively, wherein TC1 is formed at a junction of thermoelements TE1 and TE2, wherein TC1 is a Type12 thermocouple, wherein TC2 is formed at a junction of thermoelements TE3 and TE4, wherein TC2 is a Type34 thermocouple, wherein each of the thermocouples from TC2 to TCn is made in a manner similar to TC1 and TC2, and wherein the thermocouples TC1 and TC2 to TCn can be the same or different or a variety of types of thermocouples;

proximal and distal isothermal blocks with respect to TC1 and TC2;

a thermocouple TCp formed at a junction of thermoelements TE5 and TE6 and located in the proximal block, wherein thermocouple TCp is a Type56 thermocouple, wherein thermoelements TE5 and TE6 terminate at terminals TRM1 and TRM2 in the distal block, respectively, wherein thermoelement TE2 from TC1 and thermoelement TE3 from TC2 are connected to thermocouple TCp;

a total of n−1 thermocouple junctions including the junction for thermocouple TCp between one or more temperature measurement zones and the distal block, wherein a thermoelement from one of the thermocouples and a thermoelement from another one of the thermocouples between the thermocouples TC2 and TCn is connected to each of the thermocouple junctions between the one or more temperature measurement zones and the distal block, wherein each of the n−1 thermocouple junctions is formed by a pair of compensated thermoelements, wherein each strand in a pair of compensated thermoelements extends from its respective thermocouple junction in the proximal block to a separate and independent terminal in the distal block, wherein a thermoelement from TC1 is connected to a terminal TRM3 in the proximal block, and wherein a thermoelement used to make the thermocouple junction TCn is connected to a terminal TRM4 in the proximal block;

a strand of a first thermoelement extends between terminal TRM3 and a terminal TRM5 in the distal block; and a strand of a second thermoelement extends between terminal TRM4 in the proximal block and a terminal TRMn in the distal block, wherein a circuit can be formed from each of the thermocouples TC1 and TC2 to TCn to terminals in the distal block, wherein the circuit comprises a pair of compensated thermoelements that form their respective thermocouple and extend from the respective thermocouple to separate terminals or thermocouples in the proximal block, and wherein the circuit further comprises a pair of uncompensated thermoelements that extend from said separate terminals or thermocouples in the proximal block to separate and independent terminals in the distal block.

Embodiment 11. A method for measuring temperature comprising the steps of:

employing the thermocouple assembly of embodiment 10;

measuring a temperature Td at the distal block;

measuring a voltage difference VD12 between terminals TRM1 and TRM2;

determining a temperature Tp at the proximal block using thermocouple TCp, the voltage difference VD12, the temperature Td at the distal block and information for converting the voltage difference VD12 to temperature for a Type56 thermocouple;

measuring a voltage difference VD15 between terminals TRM1 and TRM5;

determining a temperature difference T1$p$ between temperatures T1 and Tp that corresponds to the voltage VD15 for a Type12 thermocouple, wherein there is no compensation between the strand of thermoelement TE5 that extends between terminals TRM3 and TRM5 and the strand of thermoelement TE5 that extends between the thermocouple TCp and the terminal TRM1;

determining the temperature T1 as the sum of the temperature difference T1$p$ and temperature Tp;

determining a temperature TTJ at each of the thermocouple junctions between the one or more temperature measurement zones and the distal block;

determining a temperature difference TD for each of the measured temperatures T2 through Tn between the thermocouple junction for the measured temperature and a corresponding thermocouple junction between the one or more temperature measurement zones and the distal block; and determining or estimating a temperature for each of the measured temperatures T2 through Tn as the sum of the temperature difference TD for the measured temperature and the temperature TTJ at a corresponding thermocouple junction between the one or more temperature measurement zones and the distal block.

Embodiment 12. A thermocouple assembly comprising:

first and second thermocouples of the same type or different types;

thermocouple wires extending from the first and second thermocouples to a first block; a third thermocouple in the first block, wherein a leg from each of the first and second thermocouples is connected to the third thermocouple, and wherein the other leg from each of the first and second thermocouples is connected to first and second separate and independent terminals, respectively, in the first block;

a second block;

first and second extension wires joined together at one end to form the third thermocouple and extending to separate and independent terminals in the second block, wherein the first and second extension wires do not have the same thermo-electric properties as the thermocouple wires;

third and fourth extension wires connecting the first and second terminals, respectively, in the first block to separate and independent terminals in the second block; and equipment operatively connected to the second block and/or to the terminals in the second block that is designed and configured to measure, determine and/or estimate a temperature at each of the first, second and third thermocouples.

Embodiment 13. The thermocouple assembly of embodiment 12, wherein the equipment is designed and configured to determine temperatures at the first and second blocks, wherein the temperature at the first thermocouple is determined using a voltage difference between the terminal in the second block that has the third extension wire and the terminal in the second block that has the first extension wire while no connections are made between the terminals in the second block that receive the second and fourth extension wires.

Embodiment 14. The thermocouple assembly of embodiment 13, wherein the temperature at the second thermocouple is determined using a voltage difference between the terminal in the second block that has the fourth extension wire and the terminal in the second block that has the third extension wire while no connections are made between the terminals in the second block that receive the first and third extension wires.

Embodiment 15. A thermocouple assembly comprising:
more than two thermocouples of the same type or different types for indicating desired temperatures, wherein said thermocouples are referred to as desired TCs;
thermocouple wires extending from the desired TCs to a first block;
a useful thermocouple (useful TC) in the first block for each pair of desired TCs, wherein a leg from each of the pair of desired TCs is connected to the useful TC, and wherein at least a leg each from two desired TCs are connected to first and last separate and independent terminals, respectively, in the first block;
a second block;
compensated extension wires joined together at one end to form each of the useful TCs, wherein the compensated extension wires extend to separate and independent terminals in the second block, wherein the compensated extension wire does not have the same thermoelectric properties as the thermocouple wires;
first and last extension wires connecting the first and second terminals, respectively, in the first block to separate and independent terminals in the second block; and
equipment operatively connected to the second block and/or to the terminals in the second block that is designed and configured to measure, determine and/or estimate the desired temperatures and temperatures at the useful TCs, preferably where there is at least one fewer useful TC than desired TCs.

Embodiment 16. A thermocouple assembly comprising:
thermocouples TC1 and TC2 for indicating temperatures T1 and T2, respectively, wherein TC1 is formed at a junction of thermoelements TE1 and TE2, wherein TC1 is a Type12 thermocouple, wherein TC2 is formed at a junction of thermoelements TE3 and TE4, wherein TC2 is a Type34 thermocouple;
proximal and distal isothermal blocks with respect to TC1 and TC2;
a thermocouple TC3 formed at a junction of thermoelements TE5 and TE6 and located in the proximal block, wherein thermocouple TC3 is a Type56 thermocouple, wherein thermoelements TE5 and TE6 terminate at terminals TRM1 and TRM2 in the distal block, respectively, wherein thermoelement TE2 from TC1 and thermoelement TE3 from TC2 are connected to thermocouple TC3, wherein thermoelement TE1 from TC1 and thermoelement TE4 from TC2 are connected to terminals TRM3 and TRM4 in the proximal block, respectively;
a strand of thermoelement TE5 extends between terminal TRM3 and a terminal TRM5 in the distal block; a strand of thermoelement TE6 extends between terminal TRM4 and a terminal TRM6 in the distal block; and
equipment operatively connected to the distal block and/or to the terminals in the distal block that is designed and configured to measure, determine and/or estimate the temperatures T1 and T2,
preferably where the thermocouple assembly is used for: measuring a temperature T4 at the distal block; measuring a voltage difference VD12 between terminals TRM1 and TRM2; determining a temperature T3 at the proximal block using thermocouple TC3, the voltage difference VD12, the temperature T4 at the distal block and information for converting the voltage difference VD12 to temperature for a Type56 thermocouple; measuring a voltage difference VD15 between terminals TRM1 and TRM5; determining a temperature difference T13 between the temperatures T1 and T3 that corresponds to the voltage difference VD15 for a Type12 thermocouple; determining the temperature T1 as the sum of the temperature difference T13 and the temperature T3; measuring a voltage difference VD26 between terminals TRM2 and TRM6; determining a temperature difference T23 between temperatures T2 and T3 that corresponds to the voltage difference VD26 for a Type34 thermocouple; and determining the temperature T2 as the sum of the temperature difference T23 and the temperature T3.

Embodiment 17. A method for changing a type of thermocouple in a thermocouple assembly having a type 1 thermocouple for determining a value for a temperature T, a type 1 measuring instrument and/or transmitter and type 1 thermoelements, extension wire and/or compensation cable extending between the type 1 thermocouple and the type 1 measuring instrument and/or transmitter, the method comprising the steps of: replacing the type 1 thermocouple with a type 2 thermocouple, wherein type 1 and type 2 thermocouples are different types of thermocouples; providing a thermocouple translator device TTD between the type 2 thermocouple and the type 1 measuring instrument and/or transmitter; extending type 2 thermoelements between the type 2 thermocouple and the TTD; measuring a voltage difference VD2 at the TTD between the type 2 thermoelements; determining or estimating the temperature T for the type 2 thermocouple; determining a voltage difference VD1 that correlates to the temperature T for a type 1 thermocouple using the TTD; and outputting the voltage difference VD1 to the type 1 thermoelements, extension wire and/or compensation cable, thereby inputting the voltage difference VD1 to the type 1 measuring instrument and/or transmitter so that the type 1 measuring instrument and/or transmitter can indicate the temperature T.

While the preferred embodiments of the invention have been illustrated in detail, it is apparent that modifications and adaptations of the preferred embodiments will occur to those skilled in the art. Such modifications and adaptations are in the spirit and scope of the invention as set forth in the following claims.

What is claimed is:

1. A thermocouple assembly comprising:
   first and second thermocouples of the same type or different types;
   thermocouple wires extending from the first and second thermocouples to a first block;
   a third thermocouple in the first block, wherein a leg from each of the first and second thermocouples is connected to the third thermocouple, and wherein the other leg from each of the first and second thermocouples is connected to first and second separate and independent terminals, respectively, in the first block;
   a second block;
   first and second extension wires or compensation cable joined together at one end to form the third thermocouple and extending to separate and independent terminals in the second block, wherein the first and second extension wires or compensation cable do not have the same thermo-electric properties as the thermocouple wires;
   third and fourth extension wires or compensation cable connecting the first and second terminals, respectively, in the first block to separate and independent terminals in the second block; and
   equipment operatively connected to the second block and/or to the terminals in the second block that is designed and configured to measure, determine and/or estimate a temperature at each of the first, second and third thermocouples.

2. The thermocouple assembly of claim 1, wherein the equipment comprises a multiplexer and a transmitter or measuring instrument that is designed and configured to determine an ambient or cold junction temperature and to output a temperature indication, and wherein the multiplexer is designed and configured to make and break certain connections between terminals in the second block to isolate circuits for determining temperatures at the first, second and third thermocouples.

3. The thermocouple assembly of claim 1, wherein the equipment is designed and configured to determine temperatures at the first and second blocks, and wherein the equipment is designed and configured to determine a temperature at the first thermocouple using a voltage difference between terminals at the second block that receive the first and third extension wires or compensation cable while no circuit is made using the terminals at the second block that receive the second and fourth extension wires or compensation cable.

4. The thermocouple assembly of claim 3, wherein the equipment is designed and configured to determine a temperature at the second thermocouple using a voltage difference between terminals at the second block that receive the second and fourth extension wires or compensation cable while no circuit is made using the terminals at the second block that receive the first and third extension wires or compensation cable.

5. The thermocouple assembly of claim 4, wherein the equipment comprises a measuring instrument transmitter and a multiplexer that are used to determine temperatures at the first and second blocks.

6. The thermocouple assembly of claim 1, wherein the extension wires or compensation cable and the thermocouple wires comprise different metal compositions, and wherein the extension wires or compensation cable are not suitable for use as extensions of the thermocouple wires.

7. The thermocouple assembly of claim 1, wherein the first and second thermocouples are type N and the extension wires are type K extension wire.

8. The thermocouple assembly of claim 1, wherein the first and second thermocouples are type B and the extension wires are type K or type N extension wire.

9. The thermocouple assembly of claim 1, wherein the first and second thermocouples are type R and the extension wires are type K or type N extension wire.

10. The thermocouple assembly of claim 1, wherein the first and second thermocouples are type S and the extension wires are type K or type N extension wire.

11. The thermocouple assembly of claim 2, further comprising two or more additional thermocouples, wherein a leg from each of a pair of additional thermocouples is connected to a new thermocouple that is formed at the junction of extension or compensation cables that run from the new thermocouple to separate and independent terminals at the second block.

12. The thermocouple assembly of claim 11, wherein at least one of the two or more additional thermocouples is not located in the first block.

13. A thermocouple assembly comprising:
    more than two thermocouples of the same type or different types for indicating desired temperatures, wherein said thermocouples are referred to as desired TCs;
    thermocouple wires extending from the desired TCs to a first block;
    a useful thermocouple (useful TC) in the first block or elsewhere for each pair of desired TCs, wherein a leg from each of the pair of desired TCs is connected to the useful TC, and wherein at least a leg each from two desired TCs are connected to first and last separate and independent terminals, respectively, in the first block;
    a second block;
    compensated extension wires or cables joined together at one end to form each of the useful TCs, wherein the compensated extension wires or cables extend to separate and independent terminals in the second block, wherein the compensated extension wire or cable does not have the same thermo-electric properties as the thermocouple wires;
    first and last extension wires or cables connecting the first and last terminals, respectively, in the first block to separate and independent terminals in the second block; and
    equipment operatively connected to the second block and/or to the terminals in the second block that is designed and configured to measure, determine and/or estimate the desired temperatures and temperatures at the useful TCs.

14. The thermocouple assembly of claim 13, wherein there is at least one fewer useful TC than desired TCs.

15. The thermocouple assembly of claim 14, wherein the equipment comprises a multiplexer and a transmitter or measuring instrument that is designed and configured to determine an ambient or cold junction temperature and to output a temperature indication, and wherein the multiplexer is designed and configured to make and break certain connections between terminals in the second block to isolate circuits for determining temperatures at the desired and useful TCs.

16. A thermocouple assembly comprising:
    thermocouples TC1 and TC2 for indicating temperatures T1 and T2, respectively, wherein TC1 is formed at a junction of thermoelements TE1 and TE2, wherein TC1 is a Type12 thermocouple, wherein TC2 is formed at a junction of thermoelements TE3 and TE4, wherein TC2 is a Type34 thermocouple;

proximal and distal isothermal blocks with respect to TC1 and TC2;

a thermocouple TC3 formed at a junction of thermoelements TE5 and TE6 and located in the proximal block, wherein thermocouple TC3 is a Type56 thermocouple, wherein thermoelements TE5 and TE6 terminate at terminals TRM1 and TRM2 in the distal block, respectively, wherein thermoelement TE2 from TC1 and thermoelement TE3 from TC2 are connected to thermocouple TC3, wherein thermoelement TE1 from TC1 and thermoelement TE4 from TC2 are connected to terminals TRM3 and TRM4 in the proximal block, respectively;

a strand of thermoelement TE5 extends between terminal TRM3 and a terminal TRM5 in the distal block;

a strand of thermoelement TE6 extends between terminal TRM4 and a terminal TRM6 in the distal block; and equipment operatively connected to the distal block and/or to the terminals in the distal block that is designed and configured to measure, determine and/or estimate the temperatures T1 and T2.

17. The thermocouple assembly of claim 16, wherein thermocouples TC1 and TC2 are type N, B, R or S.

18. The thermocouple assembly of claim 16, wherein the thermoelements TE5 and TE6 are type N or K extension wires or compensation cable.

19. The thermocouple assembly of claim 16, wherein the thermoelement TE5 that extends between terminal TRM3 and terminal TRM5 in the distal block and the thermoelement TE5 that extends between the thermocouple TC3 and terminal TRM1 are used by the equipment in a circuit for determining or estimating the temperature T1.

20. The thermocouple assembly of claim 19, wherein the thermoelement TE6 that extends between terminal TRM4 and terminal TRM6 in the distal block and the thermoelement TE6 that extends between the thermocouple TC3 and terminal TRM2 are used by the equipment in a circuit for determining or estimating the temperature T2.

21. The thermocouple assembly of claim 19, wherein the thermoelement TE5 that extends between terminal TRM3 and terminal TRM5 in the distal block and the thermoelement TE5 that extends between the thermocouple TC3 and terminal TRM1 have the same polarity.

22. The thermocouple assembly of claim 21, wherein the thermoelement TE5 that extends between the thermocouple TC3 and terminal TRM1 in the distal block and the thermoelement TE6 that extends between the thermocouple TC3 and terminal TRM2 in the distal block do not have the same polarity.

23. A method for measuring temperature comprising the steps of:
employing the thermocouple assembly of claim 16;
measuring a temperature T4 at the distal block;
measuring a voltage difference VD12 between terminals TRM1 and TRM2;
determining a temperature T3 at the proximal block using thermocouple TC3, the voltage difference VD12, the temperature T4 at the distal block and information for converting the voltage difference VD12 to temperature for a Type56 thermocouple;
measuring a voltage difference VD15 between terminals TRM1 and TRM5;
determining a temperature difference T13 between the temperatures T1 and T3 that corresponds to the voltage difference VD15 for a Type12 thermocouple;
determining the temperature T1 as the sum of the temperature difference T13 and the temperature T3;
measuring a voltage difference VD26 between terminals TRM2 and TRM6;
determining a temperature difference T23 between temperatures T2 and T3 that corresponds to the voltage difference VD26 for a Type34 thermocouple; and
determining the temperature T2 as the sum of the temperature difference T23 and the temperature T3.

24. A method for measuring temperature comprising the steps of:
employing the thermocouple assembly of claim 22, wherein the equipment comprises a multiplexer operatively connected to the terminals in the distal block for making and breaking circuits within the thermocouple assembly and a transmitter or measuring instrument for determining an ambient or cold junction temperature at the distal block and for outputting temperature indications;
measuring a temperature T4 at the distal block;
measuring a voltage difference VD12 between terminals TRM1 and TRM2;
determining a temperature T3 at the proximal block using thermocouple TC3, the voltage difference VD12, the temperature T4 at the distal block and information for converting the voltage difference VD12 to temperature for a Type56 thermocouple;
measuring a voltage difference VD15 between terminals TRM1 and TRM5;
determining a temperature difference T13 between the temperatures T1 and T3 that corresponds to the voltage difference VD15 for a Type12 thermocouple;
determining the temperature T1 as the sum of the temperature difference T13 and the temperature T3 using a circuit formed by the thermoelements TE1 and TE2 from thermocouple TC1 and the thermoelements TE5 that extend from terminal TRM3 to terminal TRM5 and from thermocouple TC3 to terminal TRM1 without a connection to the thermoelements TE3 or TE6;
measuring a voltage difference VD26 between terminals TRM2 and TRM6;
determining a temperature difference T23 between temperatures T2 and T3 that corresponds to the voltage difference VD26 for a Type34 thermocouple; and
determining the temperature T2 as the sum of the temperature difference T23 and the temperature T3 using a circuit that is not connected to thermoelements TE1, TE2 or TE5.

25. The thermocouple assembly of claim 16, wherein the temperatures T1 and T2 are in a hot or cold zone, further comprising one or more additional thermocouples for measuring a temperature in the hot or cold zone and one fewer thermocouples in or associated with the proximal block than are in the hot or cold zone.

26. A thermocouple assembly comprising:
thermocouples TC1 and TC2 to TCn for measuring temperatures T1 and T2 through Tn, respectively, wherein TC1 is formed at a junction of thermoelements TE1 and TE2, wherein TC1 is a Type12 thermocouple, wherein TC2 is formed at a junction of thermoelements TE3 and TE4, wherein TC2 is a Type34 thermocouple, wherein each of the thermocouples from TC2 to TCn is made in a manner similar to TC1 and TC2, and wherein the thermocouples TC1 and TC2 to TCn can be the same or different or a variety of types of thermocouples;

proximal and distal isothermal blocks with respect to TC1 and TC2;

a thermocouple TCp formed at a junction of thermoelements TE5 and TE6 and located in the proximal block, wherein thermocouple TCp is a Type56 thermocouple, wherein thermoelements TE5 and TE6 terminate at terminals TRM1 and TRM2 in the distal block, respectively, wherein thermoelement TE2 from TC1 and thermoelement TE3 from TC2 are connected to thermocouple TCp;

a total of n−1 thermocouple junctions including the junction for thermocouple TCp between one or more temperature measurement zones and the distal block, wherein a thermoelement from one of the thermocouples and a thermoelement from another one of the thermocouples between the thermocouples TC2 and TCn is connected to each of the thermocouple junctions between the one or more temperature measurement zones and the distal block, wherein each of the n−1 thermocouple junctions is formed by a pair of compensated thermoelements, wherein each strand in a pair of compensated thermoelements extends from its respective thermocouple junction in or associated with the proximal block to a separate and independent terminal in the distal block, wherein a thermoelement from TC1 is connected to a terminal TRM3 in the proximal block, and wherein a thermoelement used to make the thermocouple junction TCn is connected to a terminal TRM4 in the proximal block;

a strand of a first thermoelement extends between terminal TRM3 and a terminal TRM5 in the distal block; and a strand of a second thermoelement extends between terminal TRM4 in the proximal block and a terminal TRMn in the distal block, wherein a circuit can be formed from each of the thermocouples TC1 and TC2 to TCn to terminals in the distal block, wherein the circuit comprises a pair of compensated thermoelements that form their respective thermocouple and extend from the respective thermocouple to separate terminals or thermocouples in or associated with the proximal block, and wherein the circuit further comprises a pair of uncompensated thermoelements that extend from said separate terminals or thermocouples in the proximal block to separate and independent terminals in the distal block.

27. A method for measuring temperature comprising the steps of:

employing the thermocouple assembly claim 26;

measuring a temperature Td at the distal block;

measuring a voltage difference VD12 between terminals TRM1 and TRM2;

determining a temperature Tp at the proximal block using thermocouple TCp, the voltage difference VD12, the temperature Td at the distal block and information for converting the voltage difference VD12 to temperature for a Type56 thermocouple;

measuring a voltage difference VD15 between terminals TRM1 and TRM5;

determining a temperature difference T1$p$ between temperatures T1 and Tp that corresponds to the voltage VD15 for a Type12 thermocouple, wherein there is no compensation between the strand of thermoelement TE5 that extends between terminals TRM3 and TRM5 and the strand of thermoelement TE5 that extends between the thermocouple TCp and the terminal TRM1;

determining the temperature T1 as the sum of the temperature difference T1$p$ and temperature Tp;

determining a temperature TTJ at each of the thermocouple junctions between the one or more temperature measurement zones and the distal block;

determining a temperature difference TD for each of the measured temperatures T2 through Tn between the thermocouple junction for the measured temperature and a corresponding thermocouple junction between the one or more temperature measurement zones and the distal block; and determining or estimating a temperature for each of the measured temperatures T2 through Tn as the sum of the temperature difference TD for the measured temperature and the temperature TTJ at a corresponding thermocouple junction between the one or more temperature measurement zones and the distal block.

* * * * *